2,861,948

PROCESS FOR REMOVING PHENOLS FROM AQUEOUS SOLUTIONS BY SORPTION ON ION EXCHANGE RESINS AND ALCOHOL ELUTRIATION THEREFROM

Robert McKellar, Midland, Mich., assignor to The Dow Chemical Company, Midland, Mich., a corporation of Delaware No Drawing. Application August 12, 1953
Serial No. 373,895

7 Claims. (Cl. 210—30)

This invention concerns a method for removing a phenol solute from an aqueous solution with an anion exchange resin.

The removal of dissolved phenols from aqueous industrial waste solutions presents a difficult and troublesome problem for the reason that the phenol solute is usually present in the aqueous waste solutions in such low concentration that recovery of the phenol constituent is impractical on a cost basis. The phenol is often admixed with other solutes such as acids or salts, e. g. hydrochloric acid, sulfuric acid, sodium chloride, sodium sulfate, etc., which acids, or salts, may interfere with its removal, or with destruction of the phenol by oxidation methods, or by the action of anaerobic bacteria. Extraction of the aqueous waste solution with a water-immiscible organic solvent is costly and is usually impractical. Such method may also introduce a small amount of the organic solvent into the waste solution, which is undesirable.

The presence of even a very small amount of a phenol dissolved in an aqueous waste solution, e. g. in concentration as low as 0.01 percent by weight is undesirable since the phenol in the solution may be injurious to plant and animal life in lakes or streams so that the solution cannot satisfactorily be discharged into waters of the public domain.

There is need for a method of removing dissolved phenols from aqueous solutions, and particularly for a procedure for removing phenols from aqueous industrial waste solutions, to avoid pollution of public waters such as lakes or streams, or injury to plant and animal life therein, by discharge of the aqueous solutions containing dissolved phenols into waters of the public domain.

It is a primary object of the invention to provide a direct and efficient method for removing a dissolved phenol from an aqueous solution. Another object is to remove a phenol solute from an aqueous solution by sorbing the same on an anion exchange resin. A further object is to provide a procedure for removing a dissolved phenol from an aqueous solution of mixed solutes, which procedure involves sorbing the phenol component on an anion exchange resin, separating the treated aqueous solution from the resin and displacing the sorbed phenol from said resin. Other and related objects may appear from the following description of the invention.

According to the invention the foregoing and related objects are obtained by passing an aqueous solution containing a dissolved phenol into contact with a salt form of a strongly basic quaternary ammonium anion exchange resin, and separating the solution from the resin. The dissolved phenol, e. g. phenol itself, or other mono-hydroxy aromatic compound such as ortho-, meta-, or para-cresol, is sorbed by the strongly basic quaternary ammonium anion exchange resin and is thus removed from the aqueous solution. The solution is drained, or washed, from the resin, after which the sorbed phenol is eluted from the resin by washing the same with a water-miscible organic liquid, e. g. methyl alcohol.

Any strongly basic quaternary ammonium anion exchange resin may be employed in the process. Examples of suitable anion exchange resins are the resinous nitrogen-containing quaternary ammonium compositions composed of the reaction product of a haloalkylated cross-linked insoluble copolymer of a predominant amount of a monovinyl aromatic hydrocarbon and a minor proportion of a polyvinyl aromatic hydrocarbon, e. g. a halomethylated copolymer of styrene, ar-ethyl-vinylbenzene and divinylbenzene, and a tertiary amine such as the strongly basic quaternary ammonium anion exchange resins described in U. S. Patent Nos. 2,591,573 and 2,614,099.

Salts of the strongly basic quaternary ammonium anion exchange resins, such as the sulfate, the chloride, the nitrate, or the phenate forms of the quaternary ammonium bases, readily sorb a phenol solute from aqueous solutions. After separating the treated solution from the resin, the sorbed phenol can readily be displaced or removed from the resin by washing the latter with a water-miscible organic liquid that is a solvent for the phenol, suitably a saturated lower aliphatic alcohol such as isopropanol, ethanol, or methanol. The latter is preferred.

In a preferred embodiment, the invention comprises a method which involves feeding an aqueous solution containing a dissolved phenol into contact with a bed of a strongly basic quaternary ammonium anion exchange resin in the salt form, whereby the phenol solute is sorbed by the resin and is removed from the solution, draining, or flushing the solution from the bed of the resin with water, then eluting the sorbed phenol from the resin by washing the latter with a water-miscible lower aliphatic alcohol, and repeating this cycle of operations in treating further quantities of the phenol-containing aqueous solution.

The method may be employed for the removal of any dissolved phenol from an aqueous solution containing the same in the free phenol form. The term "phenol" used herein refers to phenol itself, i. e. mono-hydroxy-benzene, and nuclear substituted derivatives thereof containing one or more halogen atoms such as chlorine or bromine, or an alkyl, aryl, aralkyl, cycloalkyl, or alkoxy, radical directly attached to a carbon atom of the aromatic nucleus. Examples of phenols which can be sorbed from aqueous solutions containing the same in the free phenol form by the method herein described are phenol, ortho-, meta-, and para-cresol, xylenol, chlorophenol, trichlorophenol, bromophenol, ortho-phenylphenol, para-tertiary-butylphenol, penta-chlorophenol, guaiacol, ethylphenol, or carvacrol.

In practice, an aqueous solution containing a dissolved phenol is usually fed to a bed of the salt form of a strongly basic quaternary ammonium anion exchange, preferably the chloride, or the sulfate, form of the resin at a rate such that the phenol solute is all, or nearly all, sorbed by the resin and is removed from the solution. The solution is usually fed to the bed at a rate corresponding to from 0.3 to 1 gallon of the aqueous solution per minute per square foot of cross section of the resin bed, although a greater or lesser rate of flow of the aqueous solution may be used. The effluent liquor, which is free, or substantially free from the phenol solute, is drawn away from the resin. Feed of the aqueous solution to the bed of the resin is discontinued prior to exceeding the capacity of the resin to sorb the phenol from the solution. The solution is usually drained, or is flushed from the bed with water, after which the resin is washed with a water-miscible saturated lower aliphatic alcohol, e. g. methanol, to remove the sorbed phenol from the resin. Thereafter, the cycle of operations is repeated. Two or more beds of the resin may be operated in parallel so that one of the beds is being de-sorbed, e. g. by washing with methanol to remove the sorbed phenol, while the other is being employed to sorb the phenol solute from the aqueous solution. Flow of the aqueous solution, or the water-miscible alcohol, may be either up-flow or down-flow through the bed of the resin. The phenol may be separated from the alcohol solvent in usual ways, e. g. by distillation or by crystallization.

Instead of feeding a phenol-containing aqueous liquor to a bed of the ion exchange resin, the latter can be contacted in other ways with the liquor, e. g. by movement through a flowing or stationary body of the liquor, and then be removed from the aqueous liquor and be eluted with a water-miscible lower aliphatic alcohol to extract the sorbed phenol therefrom.

The following examples illustrate ways in which the principle of the invention has been applied, but are not to be construed as limiting its scope.

*Example 1*

A one inch internal diameter glass tube was filled with 255 cc. of the chloride salt of a granular strongly basic quaternary ammonium anion exchange resin to form a bed of the resin 20 inches deep. The anion exchange resin was composed of the reaction product of trimethylamine and a chloromethylated copolymer of approximately 87.5 percent by weight styrene, 4.5 percent arethylvinylbenzene and 8 percent divinylbenzene. The resin was in the form of rounded granules of sizes from 20 to 50 mesh per inch as determined by U. S. standard screens. Two liters of an aqueous solution containing 20.68 grams of dissolved phenol was fed to the column at a rate corresponding to approximately 50 cc. of the solution per minute and passed down-flow through the bed of the resin. After feed of the two liters of solution to the column, the liquor remaining in the column was drained from the bed of the resin. Thereafter, one liter of methanol was fed to the column at a rate of approximately 17 cc. per minute and trickled downward through the bed of the resin. The treated aqueous solution contained phenol in amount corresponding to less than 5 parts of the phenol per million parts of the solution. The methanol effluent liquor was collected as a separate fraction. It was analyzed and found to contain 19.36 grams of phenol.

*Example 2*

A one inch internal diameter glass tube was filled with 255 cc. of a granular strongly basic quaternary ammonium anion exchange resin in the chloride form, similar to that described in Example 1, to form a bed of the resin approximately 20 inches deep. Eight liters of an aqueous solution containing 10 percent by weight of hydrochloric acid and 0.1 percent by weight of phenol was fed to the column at a rate of 12.5 cc. of the solution per minute and passed down-flow through the bed of the resin. The effluent liquor was analyzed and found to contain phenol in amount corresponding to less than 4 parts of the phenol per million parts of the aqueous liquor.

*Example 3*

A 1.5 inch internal diameter glass tube was filled with 670 cc. of a granular strongly basic quaternary ammonium anion exchange resin composed of the reaction product of dimethylethanolamine and a chloromethylated copolymer of approximately 87.5 percent by weight of styrene, 4.5 percent of ar-ethylvinylbenzene and 8 percent divinylbenzene. The resin was treated with an aqueous 4 weight percent solution of sodium sulfate to convert the anion exchange resin to the sulfate form, after which the resin was washed with water. Thereafter, an aqueous solution containing approximately 12 percent by weight of sodium sulfate and 0.3 percent by weight of trichlorophenol was fed to the column and passed down-flow through the bed of the resin until the resin had adsorbed its capacity of the trichlorophenol. The liquor was drained from the bed of the resin, after which the resin was washed with methyl alcohol. The methyl alcohol was effective for removing the sorbed trichlorophenol from the anion exchange resin.

I claim:

1. A process for removing a phenol from an aqueous solution, which comprises contacting an aqueous solution containing a dissolved phenol as solute with a salt form of a strongly basic quaternary ammonium anion exchange resin, whereby the phenol solute is sorbed by the resin and is removed from the solution, separating the solution and the resin and washing the resin with a water-miscible saturated lower aliphatic alcohol, whereby the sorbed phenol is displaced by the alcohol and is removed from the ion exchange resin.

2. A process for removing a phenol from an aqueous solution, which comprises feeding an aqueous solution containing a dissolved phenol as solute into contact with a bed of a salt form of a strongly basic quaternary ammonium anion exchange resin, whereby the phenol solute is sorbed by the resin and is removed from the solution, withdrawing effluent liquor from the bed of the resin, then washing the resin with a water-miscible saturated lower aliphatic alcohol, whereby the sorbed phenol is displaced by the alcohol and is removed from the anion exchange resin.

3. A process as claimed in claim 2, wherein the cycle of operations is repeated.

4. A process for removing phenol from an aqueous solution, which comprises feeding an aqueous solution containing dissolved phenol as solute to a bed of a salt form of a strongly basic quaternary ammonium anion exchange resin whereby the phenol solute is sorbed by the resin, and withdrawing effluent liquor substantially free of dissolved phenol from said resin, then washing the resin with a water-miscible saturated lower aliphatic alcohol, whereby the sorbed phenol is displaced by the alcohol and is removed from the resin and repeating this cycle of operations.

5. A process as claimed in claim 4, wherein the aliphatic alcohol is methyl alcohol.

6. A process for removing trichlorophenol from an aqueous solution, which comprises feeding an aqueous solution containing an inorganic salt and trichlorophenol as solute to a bed of a salt form of a strongly basic quatenary ammonium anion exchange resin, whereby the phenol solute is sorbed by the resin, and withdrawing effluent liquor substantially free of dissolved trichlorophenol from the resin, then washing the resin with a water-miscible saturated lower aliphatic alcohol, whereby the sorbed phenol is displaced by the alcohol and is removed from the resin, and repeating the cycle of operations.

7. A process as claimed in claim 6, wherein the strongly basic quaternary ammonium anion exchange resin is employed in the sulfate form.

References Cited in the file of this patent

UNITED STATES PATENTS

| 2,521,664 | Dudley | Sept. 5, 1950 |
| 2,543,666 | Michael | Feb. 27, 1951 |
| 2,591,573 | McBurney | Apr. 1, 1952 |
| 2,614,099 | Bauman | Oct. 14, 1952 |
| 2,697,724 | Collier | Dec. 21, 1954 |
| 2,697,725 | Bryce | Dec. 21, 1954 |